(12) United States Patent
Wang et al.

(10) Patent No.: US 12,261,707 B2
(45) Date of Patent: Mar. 25, 2025

(54) METHOD, APPARATUS AND SYSTEM OF CHARGING FOR A DATA FLOW IN SDN NETWORK

(71) Applicant: Alcatel Lucent, Boulogne-Billancourt (FR)

(72) Inventors: Zhi Wang, Shanghai (CN); Hui Han, Shanghai (CN); Yigang Cai, Naperville, IL (US); Qiaobin Lai, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 484 days.

(21) Appl. No.: 15/554,113

(22) PCT Filed: Jan. 26, 2016

(86) PCT No.: PCT/IB2016/000265
§ 371 (c)(1),
(2) Date: Aug. 28, 2017

(87) PCT Pub. No.: WO2016/139533
PCT Pub. Date: Sep. 9, 2016

(65) Prior Publication Data
US 2018/0270074 A1 Sep. 20, 2018

(30) Foreign Application Priority Data
Mar. 4, 2015 (CN) .......................... 201510097275.6

(51) Int. Cl.
*H04L 12/14* (2024.01)
*H04M 15/00* (2024.01)
(52) U.S. Cl.
CPC ...... *H04L 12/1489* (2013.01); *H04L 12/1407* (2013.01); *H04M 15/66* (2013.01)

(58) Field of Classification Search
CPC .................. H04L 12/1489; H04L 12/1407
See application file for complete search history.

(56) References Cited

U.S. PATENT DOCUMENTS 8,954,588 B1 * 2/2015 Bertz .................. H04L 67/28
709/226
9,258,212 B2 * 2/2016 Pfeifer .................. H04L 45/125
(Continued)

FOREIGN PATENT DOCUMENTS

CN 103828311 A 5/2014
CN 104104520 A 10/2014
(Continued)

OTHER PUBLICATIONS

International Search Report PCT/ISA/210 for International Application No. PCT/IB2016/000265 Dated Apr. 27, 2016.
(Continued)

*Primary Examiner* — Chris Parry
*Assistant Examiner* — Steven C Nguyen
(74) *Attorney, Agent, or Firm* — Harness, Dickey & Pierce, P.L.C.

(57) ABSTRACT

The SDN control device is configured to determine a charging plan and a corresponding routing path for a data flow of a user. The charging plan is associated with a network condition-related rate of respective SDN service device in the routing path. The SDN control device is configured to configure the charging plan for the respective SDN service device. Each of the SDN service device is configured to charge the data flow based on a network condition-related rate applicable to the SDN service device in the charging plan. The each of the SDN service device is configured to aggregate generated charging information to provide it to a charging system.

14 Claims, 7 Drawing Sheets

(56) References Cited

U.S. PATENT DOCUMENTS

| | | | | |
|---|---|---|---|---|
| 2005/0083844 | A1* | 4/2005 | Zhu | H04L 45/04 370/230.1 |
| 2005/0286488 | A1* | 12/2005 | Briscoe | H04M 15/83 370/351 |
| 2011/0299410 | A1* | 12/2011 | Diab | G06Q 30/0226 370/252 |
| 2012/0054079 | A1* | 3/2012 | Hayashi | G06Q 30/04 705/34 |
| 2012/0072526 | A1* | 3/2012 | Kling | G06F 12/0871 709/213 |
| 2012/0275302 | A1* | 11/2012 | Kerr | H04L 12/14 370/230 |
| 2013/0151710 | A1* | 6/2013 | D'souza | H04L 12/1442 709/226 |
| 2014/0161037 | A1* | 6/2014 | Gumbrell | H04W 8/26 370/328 |
| 2014/0269724 | A1 | 9/2014 | Mehler et al. | |
| 2014/0280954 | A1* | 9/2014 | Yu | H04L 41/5054 709/226 |
| 2014/0376406 | A1* | 12/2014 | Kim | H04L 41/12 370/254 |
| 2015/0055623 | A1* | 2/2015 | Li | H04W 40/04 370/329 |
| 2015/0081884 | A1* | 3/2015 | Maguire | H04L 43/08 709/224 |
| 2015/0257147 | A1* | 9/2015 | Ji | H04W 92/20 370/329 |
| 2015/0263987 | A1* | 9/2015 | Klein | H04L 47/00 709/226 |
| 2016/0112327 | A1* | 4/2016 | Morris | H04L 47/127 398/45 |
| 2016/0204951 | A1* | 7/2016 | Walton | H04W 48/16 370/259 |
| 2016/0254984 | A1* | 9/2016 | Tekalp | H04L 45/38 709/242 |
| 2019/0260658 | A1* | 8/2019 | Gell | H04L 67/1097 |
| 2020/0076704 | A1* | 3/2020 | Bruno | H04L 41/40 |

FOREIGN PATENT DOCUMENTS

| | | |
|---|---|---|
| CN | 104349298 A | 2/2015 |
| CN | 104363084 A | 2/2015 |
| KR | 20150000152 A | 1/2015 |
| WO | WO-2011/040511 A1 | 4/2011 |
| WO | WO-2014166405 A1 | 10/2014 |
| WO | WO-2015/010730 A1 | 1/2015 |

OTHER PUBLICATIONS

Office Action for corresponding Chinese Application No. 201510097275.6 dated Apr. 2, 2019.

Notice of Final Rejection dated Nov. 30, 2018 for corresponding Korean Application No. 10-2017-7027973.

Office Communication for corresponding European Application No. 16 710 806.7 dated May 27, 2019.

Office Action dated Dec. 4, 2020, issued in corresponding Chinese Patent Application No. 201510097275.6.

* cited by examiner

METHOD, APPARATUS AND SYSTEM OF CHARGING FOR A DATA FLOW IN SDN NETWORK

CROSS-REFERENCE TO RELATED APPLICATIONS

This application is a national phase under 35 U.S.C. § 371 of PCT International Application No. PCT/IB2016/000265 which has an International filing date of Jan. 26, 2016, which claims priority to Chinese Application No. 201510097275.6, filed Mar. 4, 2015, the entire contents of each of which are hereby incorporated by reference.

FIELD OF THE INVENTION

The present invention relates to SDN (Software Defined Network), and more specifically, to a technology of performing smart charging on a data flow of a user in SDN network.

BACKGROUND OF THE INVENTION

Smart data charging (SDC) will play an increasingly important role in future mobile network, wideband network, and data content. The SDC provides a dynamic content-dependent mechanism for service or content providers so as to set charging for an end user as an exchange for handling a content/data request. The charged content may include a variety of aspects, e.g., request time, user location, application originating the request, current data usage pattern in the network, the overall level of network congestion, type of data being requested, or any possible aspect related to content request.

However, a key policy and charging problem in the existing SDN/Open Flow is that the tariff for different flow paths are not defined currently, not to mention dynamic content-dependent flow tariff. Further, if the SDN control device determines a flow path, the determination is mostly based on the network strategy and traffic/Qos in the prior art. Apparently, it cannot meet the demand of providing less charged routing path for the end user, which is also adverse to a service provider with a non-flat tariff of routing path selection.

SUMMARY OF THE INVENTION

The objective of the present invention is to provide a Method, Apparatus and System of smart Charging for a Data Flow in SDN Network.

According to one aspect of the present invention, a method of performing charging control for a data flow at a SDN control device is provided, wherein the method comprises:

a. determining a charging plan and a corresponding routing path for a data flow of a user, wherein the charging plan is associated with a network condition-related rate of respective SDN service device in the routing path;

b. configuring the charging plan for the respective SDN service device, such that the respective SDN service device charges the data flow.

According to another aspect of the present invention, a method for charging a data flow at a SDN service device is provided, wherein the method comprises:

receiving a charging plan determined by a SDN control device for a data flow of a user;

charging the data flow based on a network condition-related rate applicable to the SDN service device in the charging plan;

aggregating generated charging information to provide it to a charging system.

According to a further aspect of the present invention, a method for charging a data flow in a SDN network is provided, wherein the method comprises:

a SDN control device determines a charging plan and a corresponding routing path for a data flow of a user, wherein the charging plan is associated with a network condition-related rate of respective SDN service device in the routing path;

the SDN control device configures the charging plan for the respective SDN service device;

each of the SDN service device charges the data flow based on a network condition-related rate applicable to the SDN service device in the charging plan;

the each of the SDN service device aggregates generated charging information to provide it to a charging system.

According to one aspect of the present invention, an apparatus of performing charging control for a data flow at a SDN control device is provided, wherein the apparatus comprises:

a charging determining module configured to determine a charging plan and a corresponding routing path for a data flow of a user, wherein the charging plan is associated with a network condition-related rate of respective SDN service device in the routing path;

a charging configuration module configured to configure the charging plan for the respective SDN service device, such that the respective SDN service device charges the data flow.

According to another aspect of the present invention, an apparatus for charging a data flow at a SDN service device is provided, wherein the apparatus comprises:

a charging receiving module configured to receive a charging plan determined by a SDN control device for a data flow of a user;

a charging executing module configured to charge the data flow based on a network condition-related rate applicable to the SDN service device in the charging plan;

a charging reporting module configured to aggregating generated charging information to provide it to a charging system.

According to a further aspect of the present invention, a system for charging a data flow in a SDN network is provided. Herein, the system comprising a SDN control device and a plurality of SDN service devices, wherein the SDN control device comprises a charging control module, and the charging control module is configured to:

determine a charging plan and a corresponding routing path for a data flow of a user, wherein the charging plan is associated with a network condition-related rate of respective SDN service device in the routing path;

configure the charging plan for the respective SDN service device;

wherein each of the SDN service device comprises a charging module, and the charging module is configured to:

charge the data flow based on a network condition-related rate applicable to the SDN service device in the charging plan;

integrate charging information generated by the SDN service device on which the charging module is equipped, to provide it to a charging system.

Compare to prior art, through enhancing the existing SDN network, the present invention enable the enhanced SDN network to implement the smart charging for user data flows and smart charging controlled flow routing, that is, the network condition-dependent tariff and charging for flow path routing is provided. In addition, this patent invention also proposes a routing path tariff based routing path selection solution in SDN network.

This present invention provides dynamic context-dependent mechanism for smart charging in SDN network to set routing rates for each routing path. Moreover, this enables SDN network to select routing path base on the consideration of path tariff, which meets the demand of lower routing rates for end users and enables service providers to get motivation to provide non-flat tariff of routing path selection, and thus get more revenues.

BRIEF DESCRIPTION OF FIGURES

Through reading the following detailed depiction on the non-limiting embodiments with reference to the accompanying drawings, the other features, objectives, and advantages of the present invention will become clearer.

Same or like reference numerals in the accompanying drawings indicate the same or corresponding components.

EMBODIMENTS OF THE INVENTION

Hereinafter, the present invention will be further described in detail with reference to the accompanying drawings.

The present invention proposes a solution for smart SDN/open flow charging and charging controlled flow routing. The SDN network is enhanced to enable the smart charging policy and execution, that is, the network condition-dependent tariff and charging is provided for flow path routing.

Figure 1:
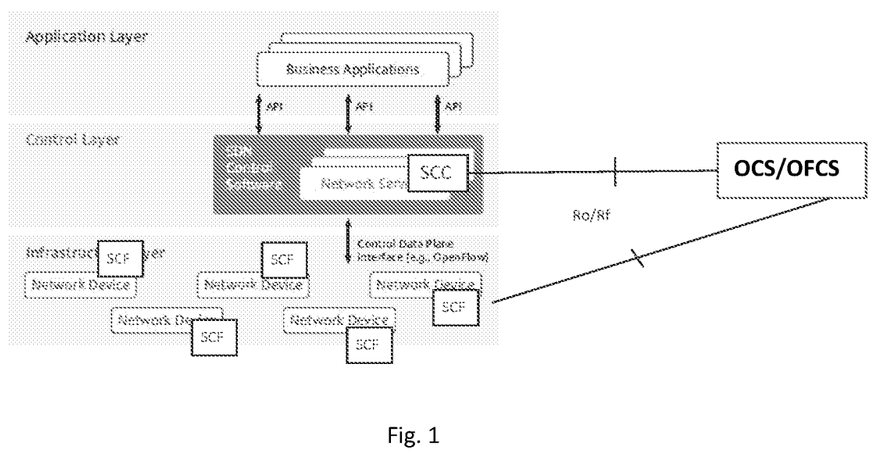
FIG. 1 shows a topology of the enhanced SDN network for implementing SDC according to the present invention.

Refer to FIG. 1, in which a schematic diagram of SDN network enhanced to implement SDC is presented. Herein, logical modules related to smart charging are introduced into SDN control device and SDN service devices.

As shown in FIG. 1, the SDN network comprises 3 layers, i.e., an application layer, a control layer, and an infrastructure layer. Herein, a SDN control device is a network device arranged on the control layer, which is equipped with a SCC (Smart Charging Controller) logical module. A SDN service device is a network device arranged on the infrastructure layer, which is equipped with a SCF (Smart Charging Function) logical module. Moreover, the SDN control device and the SDN service device may both be connected to the charging system; or, the SDN service device may communicate with the charging system via the SDN control device. The charging system may be, for example, OCS (Online Charging System)/OFCS (offline charging system).

Figure 2:
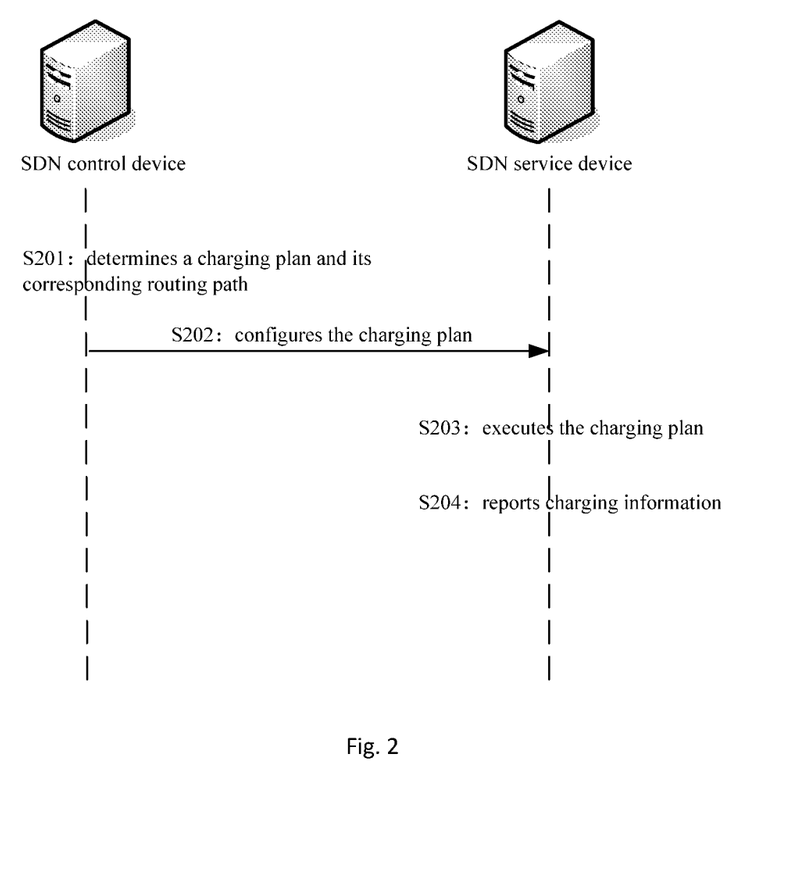
FIG. 2 shows a flowchart of a method of charging for a data flow in SDN network according to an embodiment of the present invention.

With reference to FIGS. 1 and 2 in cooperation, according to one embodiment of the present invention, in step S201, SDN control device determines a charging plan and a corresponding routing path for a data flow of a user, wherein the charging plan is associated with network condition-related rates of respective SDN service device in the corresponding routing path; in step S202, the SDN control device configures the charging plan for the respective SDN service device, and correspondingly, the respective SDN service device receives the charging plan from the SDN control device; in step S203, the respective SDN service device charges the data flow based on its applicable network condition-related rate in the charging plan; in step S204, the respective SDN service device aggregates the generated charging information to provide it to a charging system.

Specifically, in step S201, the SDN control device determines a smart charging plan for a user based on, for example, charging information of the charging system, local provisions, business applications at the application layer, or relevant information provided by other network device in the SDN network, thereby determining a routing path corresponding to the smart charging plan.

For example, both SDN service device 1 and SDN service device 2 may provide the same network function, e.g., video optimizer, and both of their network condition-related rates are shown in table 1 and table 2 below, respectively.

TABLE 1

Network condition-related Rates of SDN Service Device 1

| Criterion of Network Condition | Rate |
|---|---|
| Congestion Level 1 | $1.50/Gb |
| Congestion Level 2 | $3.00/Gb |
| No Congestion | $0.50/Gb |

TABLE 2

Network condition-related Rates of SDN Service Device 2

| Criterion of Network Condition | Rate |
|---|---|
| Default | $1.25/Gb |

In order to adopt a charging plan with a lower fee, the SDN control device selects the SDN service device 1 that may provide the lowest rate (i.e., $0.50/Gb) for the data flow of the user. In a same or similar manner, the SDN control device may determine a charging plan and a corresponding routing path for the data flow of the user.

Here, network condition includes, but not limited to, any network related state that is applicable for the present invention and can be detected by the SDN network, such as time, traffic, service usage, subscriber profile, etc. The network condition-related rates of the SDN service devices, for example, may be reported by respective SDN service device to the SDN control device, or obtained by the SDN control device from the charging system. The network condition-related rate varies with the criterion of network condition.

In step S202, the SDN control device configures the charging plan for respective SDN service device. Specifically, the SDN control device sends the charging plan to respective SDN service device in the corresponding routing path. For example, the respective SDN service device is controlled by the SDN control device through southbound API, e.g., Open Flow, and the SDN control device downloads the charging plan to the corresponding respective SDN service device via the API.

Figure 4:
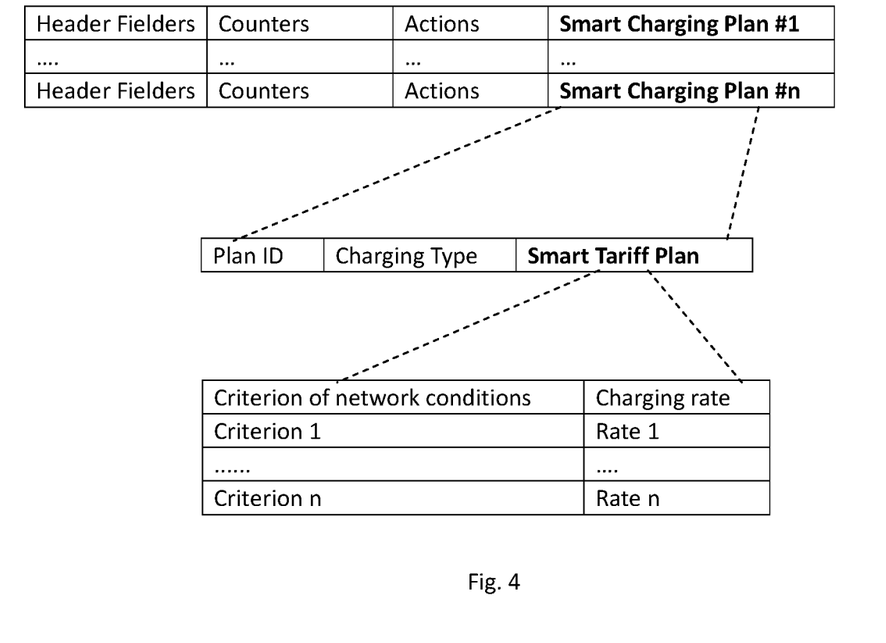
FIG. 4 shows a schematic diagram of an enhanced flow table with smart charging plan according to an embodiment of the present invention.

Refer to FIG. 4, in which an exemplary enhanced Flow Table carrying a smart charging plan is presented. Here, since the enhanced flow needs to be transmitted through southbound API, e.g., Open Flow, the southbound API between the SDN service devices and the SDN control device will also be enhanced correspondingly.

As shown in FIG. 4, the present invention enhances the existing flow table such that the enhanced flow table can carry smart charging plans. Each data flow corresponds to a smart charging plan. Each smart charging plan includes a plan ID, charging type, and smart tariff plan.

Here, the plan ID may be a number uniquely identifying an associated smart charging plan.

The charging type includes, for example, online charging, offline charging, and etc.

The smart tariff plan refers to the network condition-related rates of SDN service devices selected by the SDN control device. A smart tariff plan includes a set of rate rules, each rate rule corresponding to a network condition, e.g., congestion level, subscriber profile, etc. Further, a rate rule comprises respective criterion of the network condition and their corresponding rates.

Because the rates vary with the network conditions, each routing path may be charged as per network condition-based rates. For example, a VIP subscriber/application may get a lower price than others; a lower rate may be adopted when the traffic is lower than a threshold; an incremental rate may be adopted for an insignificant subscriber/application when the traffic is higher than a threshold.

In step S203, respective SDN service device charges the data flow based on its applicable network condition-related rate in the charging plan.

For example, return to refer to the above Table 1 and Table 2, if the SDN service device 1 receives the charging plan, it will charge the data flow according to the Table 1; or, if the SDN service device 2 receives the charging plan, then it will charge the data flow according to the Table 2.

In this case, respective SDN service device in the routing path of the user data flow collects its network condition associated with the charging and calculates the real rates.

In step S204, respective SDN service device aggregates the charging information generated thereby, so as to provide it to the charging system. The aggregated charging information may, for example, include time, rate of the current SDN service device, routed traffic flow, and total expense incurred on the current SDN service device, etc. Here, an SDN service device may directly send its aggregated charging device to the charging system or send the aggregated charging information to the charging system via the SDN control device, which depends on whether the SDN service device is directly connected to the charging system. Besides, the SDN service device also reports a charging event to the SDN control device.

Figure 3:
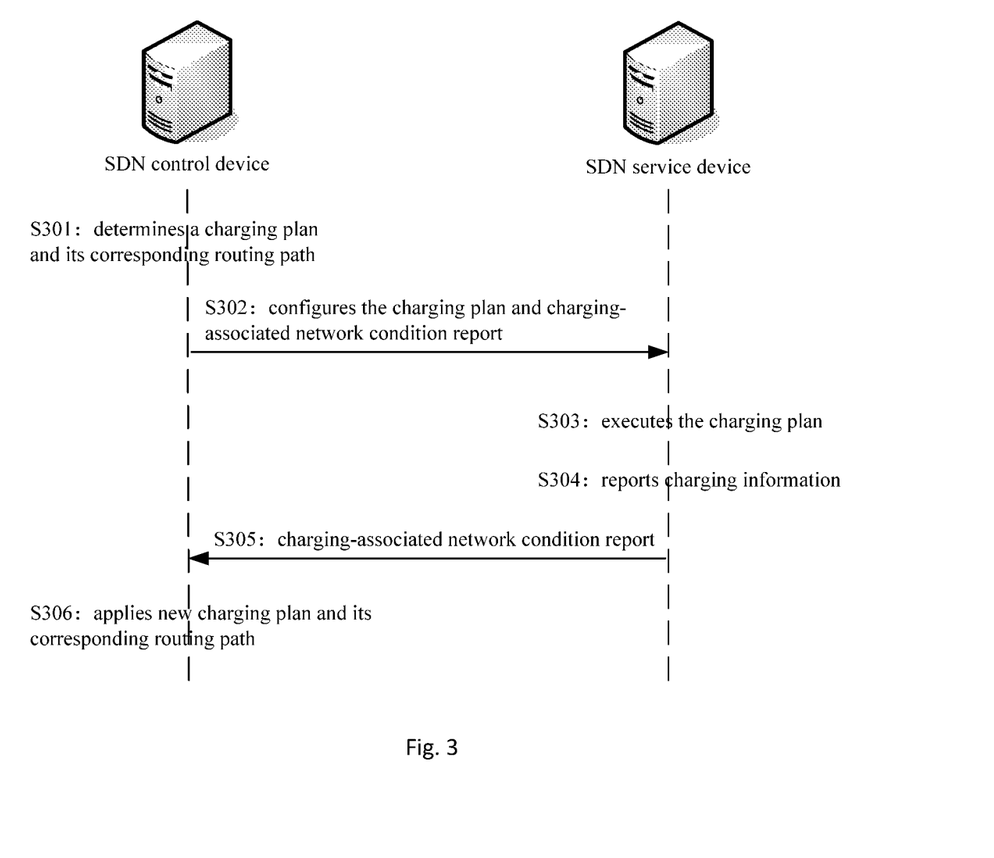
FIG. 3 shows a flowchart of a method of charging for a data flow in SDN network according to a preferred embodiment of the present invention.

According to one preferred embodiment of the present invention, in conjunction with FIGS. 1 and 3, in step S301, SDN control device determines a charging plan and a corresponding routing path for a data flow of a user, wherein the charging plan is associated with a network condition-related rate of respective SDN service device in the corresponding routing path; in step S302, the SDN control device configures, for the respective SDN service device, the charging plan and a network condition report associated with charging of the respective SDN service device; correspondingly, the respective SDN service device receives, from the SDN control device, the charging plan and the configuration of the SDN control device for the network condition report associated with the charging of the SDN service device; in step S303, the respective service device charges the data flow based on its applicable network condition-related rate in the charging plan; in step S304, the respective SDN service device aggregates the charging information generated by itself to provide it to the charging system. In addition, in step S305, when change of the configured charging-associated network condition on at least one of the SDN service devices occurs, the SDN service device(s) reports the corresponding charging-associated network condition to the SDN control device. Correspondingly, the SDN control device receives the respective charging-associated network condition report of the SDN service device(s); in step S306, the SDN control device re-applies a new charging plan and a corresponding routing path for the data flow.

It should be noted that in the above preferred embodiment, the SDN control device's configuration on the charging-associated network condition report for the respective SDN service device is determined based on the charging plan determined by the SDN control device. Based on the charging plan, the SDN control device configures each SDN service device as selected, and the charging-associated network condition change that should be reported by the each SDN service device to the SDN control device, e.g., low balance of the flow path, causes increase of the rate or the increase above the threshold.

For example, the SDN service device 3 charges based on the criterion of network congestion level, while the SDN service device 4 charges based on the criterion of subscriber profile, then the SDN control device configures a corresponding network condition report for the SDN service device 3 or 4, respectively, such that when the rate of the SDN service device 3 or 4 changes, e.g., the SDN service device 3 changes from no congestion to congestion level 1, the corresponding rate will increase, and then the SDN service device 3 should send the network condition report to the SDN control device. Since the network condition report is associated with charging, it may be regarded as a charging event report. The charging event report may trigger the SDN control device to reselect an appropriate flow routing path based on the new network condition.

Figure 5:
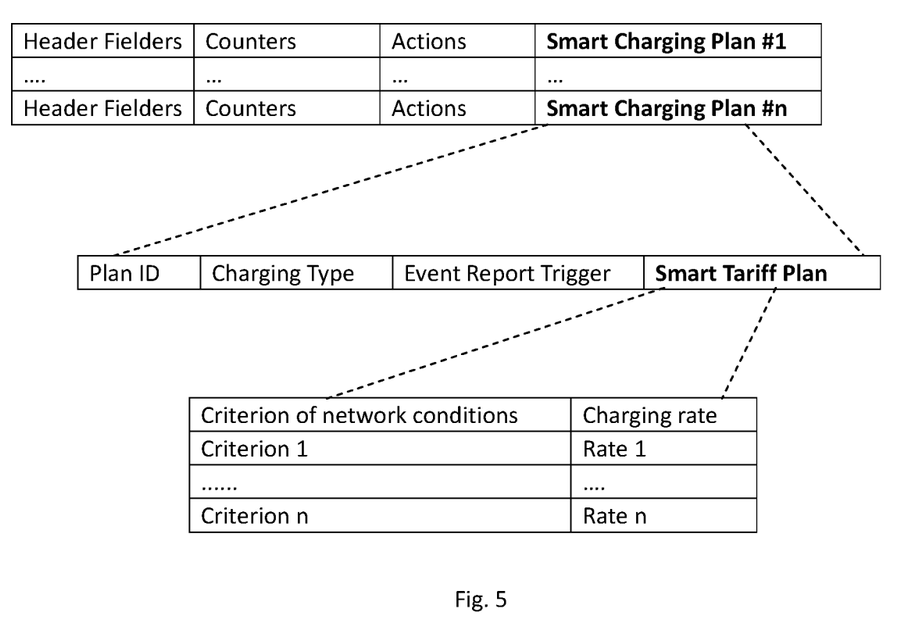
FIG. 5 shows a schematic diagram of an enhanced flow table with smart charging plan according to a preferred embodiment of the present invention.

In conjunction with FIGS. 4 and 5, when the SDN control device further configures their respective charging-associated network condition reports for respective SDN service device, the smart charging plan should further include event report trigger in FIG. 5.

Moreover, the above steps S305 and S306 do not have a strict sequential relationship with processes S301-S304. Here, for example, in a data flow transmission process, none of the rates of respective service devices changes; then, steps S305 and S306 will not be performed. Each data flow is transmitted in a unit of package, and after one data package therein starts being transmitted, the network conditions of some SDN service devices change; therefore, through steps S305 and S306, the routing path of the data flow is re-determined, such that the packages after the package adopt the re-determined routing path.

Here, when receiving the charging-associated network condition report from the SDN service device, the SDN control device re-applies a new charging plan and its corresponding routing path for the data flow.

Here, the new charging plan may be determined together with the previous charging plan. In other words, when the SDN service device determines a charging plan for the data flow in step S301, it may determine two charging plans, wherein one charging plan is adopted immediately, and the other charging plan may act as a candidate charging plan to be activated through step S306.

Alternatively, the new charging plan may also be re-determined in real-time for the data flow when the SDN control device receives the charging event report from the SDN service device. Herein, the manners in which the SDN control device re-determines the new charging plan at least include: 1) the SDN control device re-performs step S301 to determine a new charging plan and a corresponding routing path; 2) based on the network function performed by the SDN service device sending the charging event report, the SDN control device re-selects an alternative SDN service device that can perform the same network function but has a lower rate so as to replace the reporting SDN service device in the current charging plan and routing path with a corresponding alternative SDN service device.

When the new charging plan and the corresponding routing path are determined, the SDN control device still needs to continue controlling the configuration and execution of the new charging plan and routing path through steps S302-S304 and monitoring the corresponding charging event report through steps S305 and S306, so as to update the charging plan and the routing path at any time, thereby providing a smart charging plan and a routing path controlled thereby for the user.

In addition, the present invention also provides a solution of routing path selection based on routing rates in the SDN network. For example, referring to the above Table 1 and 2, SDN service devices 1 and 2 can provide the same network function, but they have different rates for data flow 1. Since data flow 1 requires a lower expense routing and the SDN service device 1 can currently provide a lowest rate (i.e. $0.50/Gb), SCC on the SDN control device select the SDN service device 1 for the data flow 1. And, in order to guarantee the data flow 1 can always get a lower expense data service, the SCC configures a charging event report of "Charging Rate Increased" for the SDN service device 1, such that SCF on the SDN service device 1 will send a corresponding report to the SDN control device if the rate for the data flow 1 increases. Then, data/service delivery starts, and the SCF on the SDN service device 1 calculates the real rates based on the smart tariff plan, i.e., Criterion of Network Condition is No Congestion, and aggregates charging information to send to the charging system. Congestion happens on the SDN service device 1, i.e., Criterion of Network Condition is Congestion Level 1, a new rate $1.50/Gb starts applying based on the smart tariff plan. The SCF on the SDN service device 1 reports the event to the SDN control device based on the configuration of charging event report. The SCC on the SDN control device re-select the SDN service device 2 to route the data flow 1, due to a currently lower rate $1.25/Gb on it.

Figure 6:
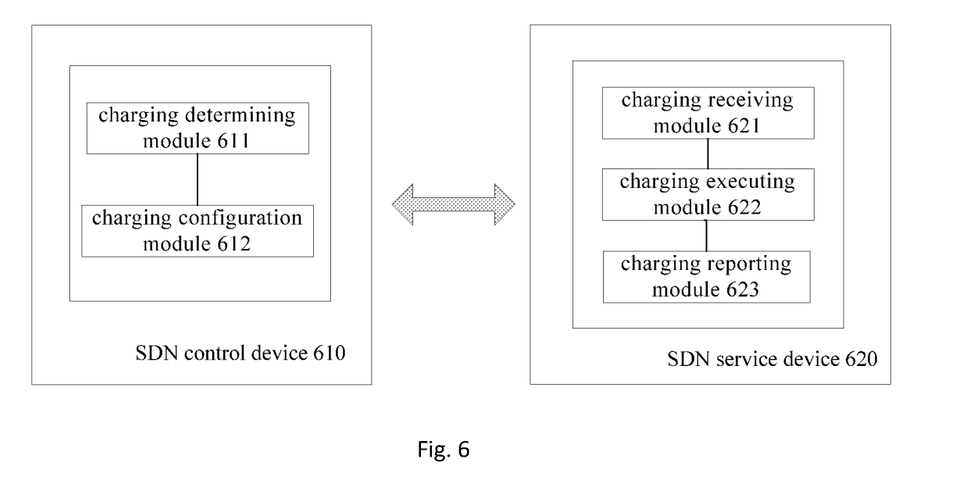
FIG. 6 shows a schematic diagram of apparatuses of a system for charging for a data flow in SDN network according to an embodiment of the present invention.

According to one embodiment of the present invention, referring to FIG. 6, where a SDN control device and a SDN service device are enhanced to cooperatively perform smart charging for a data flow of a user and a corresponding routing selection.

Specifically, the SDN control device 610 comprises a charging determining module 611 and a charging configuration module 612; the SDN service device 620 comprises a charging receiving module 621, a charging executing module 622 and a charging reporting module 623.

Please note that, there should be a plurality of SDN service devices 620, and each SDN service device 620 should comprise a charging receiving module 621, a charging executing module 622 and a charging reporting module 623. Here, for brevity, FIG. 6 merely shows one SDN service device 620 which should not be considered as any interpretation or limitation of the present invention.

Preferably, the above charging determining module 611 and charging configuration module 612 can be integrated together as one function module to be equipped in the SDN control device 610, and such function module can be a charging control module, e.g., SCC. The above charging receiving module 621, charging executing module 622 and charging reporting module 623 can be integrated together as one function module to be equipped in the SDN service device 620, and such function module can be a charging module, e.g., SCF.

With reference to FIGS. 1 and 6 in cooperation, the charging determining module 611 of the SDN control device 610 determines a charging plan and a corresponding routing path for a data flow of a user, wherein the charging plan is associated with network condition-related rates of respective SDN service device in the corresponding routing path; then, the charging configuration module 612 of the SDN control device 610 configures the charging plan for the respective SDN service device, and correspondingly, the charging receiving module 621 of the respective SDN service device 620 receives the charging plan from the SDN control device; the charging executing module 622 of the respective SDN service device 620 charges the data flow based on its applicable network condition-related rate in the charging plan; then, the charging reporting module 623 of the respective SDN service device 620 aggregates the generated charging information to provide it to a charging system.

Specifically, the charging determining module 611 of the SDN control device 610 determines a smart charging plan for a user based on, for example, charging information of the charging system, local provisions, business applications at the application layer, or relevant information provided by other network device in the SDN network, thereby determining a routing path corresponding to the smart charging plan.

For example, both SDN service device $620_1$ and SDN service device $620_2$ may provide the same network function, e.g., video optimizer, and both of their network condition-related rates are shown in the above table 1 and table 2. In order to adopt a charging plan with a lower fee, the charging determining module 611 selects the SDN service device 1 that may provide the lowest rate (i.e., $0.50/Gb) for the data flow of the user. In a same or similar manner, the charging determining module 611 may determine a charging plan and a corresponding routing path for the data flow of the user.

Here, network condition includes, but not limited to, any network related state that is applicable for the present invention and can be detected by the SDN network, such as time, traffic, service usage, subscriber profile, etc. The network condition-related rates of the SDN service devices, for example, may be reported by the charging reporting module 623 of the respective SDN service device 620 to the SDN control device 610, or obtained by the SDN control device 610 from the charging system. The network condition-related rate varies with the criterion of network condition.

Then, the charging configuration module 612 of the SDN control device 610 configures the charging plan for respective SDN service device. Specifically, the charging configuration module 612 sends the charging plan to respective SDN service device 620 in the corresponding routing path. For example, the respective SDN service device 620 is controlled by the SDN control device 610 through southbound API, e.g., Open Flow, and the charging configuration module 612 downloads the charging plan to the corresponding respective SDN service device 620 via the API.

Refer to FIG. 4, in which an exemplary enhanced Flow Table carrying a smart charging plan is presented. Here, since the enhanced flow needs to be transmitted through southbound API, e.g., Open Flow, the southbound API between the SDN service devices 620 and the SDN control device 610 will also be enhanced correspondingly.

As shown in FIG. 4, the present invention enhances the existing flow table such that the enhanced flow table can carry smart charging plans. Each data flow corresponds to a smart charging plan. Each smart charging plan includes a plan ID, charging type, and smart tariff plan.

Here, the plan ID may be a number uniquely identifying an associated smart charging plan.

The charging type includes, for example, online charging, offline charging, and etc.

The smart tariff plan refers to the network condition-related rates of SDN service devices 620 selected by the charging determining module 611. A smart tariff plan includes a set of rate rules, each rate rule corresponding to a network condition, e.g., congestion level, subscriber profile, etc. Further, a rate rule comprises respective criterion of the network condition and their corresponding rates. Because the rates vary with the network conditions, each routing path may be charged as per network condition-based rates. For example, a VIP subscriber/application may get a lower price than others; a lower rate may be adopted when the traffic is lower than a threshold; an incremental rate may be adopted for an insignificant subscriber/application when the traffic is higher than a threshold.

Then, the charging executing module 622 of the respective SDN service device 620 charges the data flow based on its applicable network condition-related rate in the charging plan.

For example, return to refer to the above Table 1 and Table 2, if the SDN service device $620_1$ receives the charging plan, it will charge the data flow according to the Table 1; or, if the SDN service device $620_2$ receives the charging plan, then it will charge the data flow according to the Table 2.

In this case, the charging executing module 622 of the respective SDN service device 620 in the routing path of the user data flow collects its network condition associated with the charging and calculates the real rates.

Then, the charging reporting module 623 of the respective SDN service device 620 aggregates the charging information generated thereby, so as to provide it to the charging system. The aggregated charging information may, for example, include time, rate of the current SDN service device, routed traffic flow, and total expense incurred on the current SDN service device, etc. Here, the charging reporting module 623 may directly send its aggregated charging device to the charging system or send the aggregated charging information to the charging system via the SDN control device 610, which depends on whether the SDN service device 620 is directly connected to the charging system.

Figure 7:
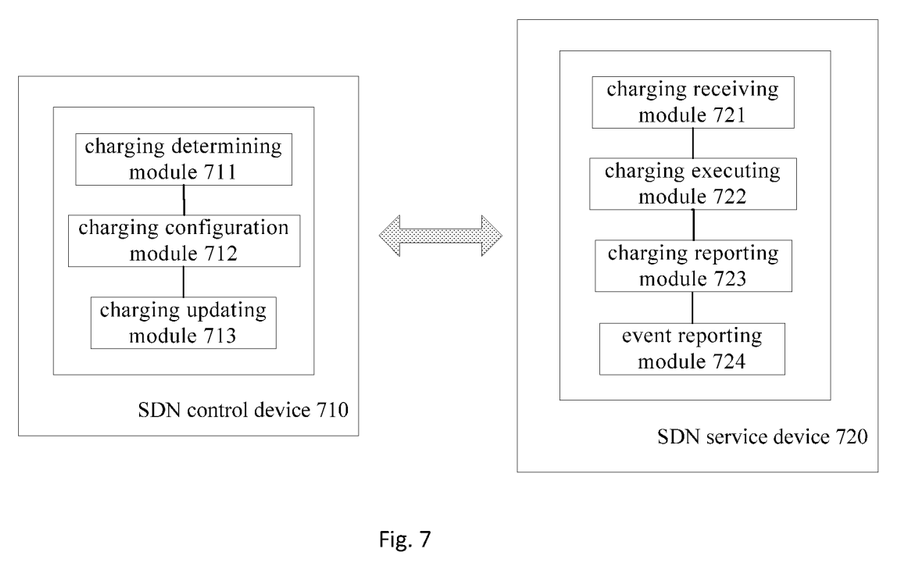
FIG. 7 shows a schematic diagram of apparatuses of a system for charging for a data flow in SDN network according to a preferred embodiment of the present invention.

According to one preferred embodiment of the present invention, referring to FIG. 7, where a SDN control device and a SDN service device are enhanced to cooperatively perform smart charging for a data flow of a user and a corresponding routing selection.

Specifically, the SDN control device 710 comprises a charging determining module 711, a charging configuration module 712 and a charging updating module 713; the SDN service device 720 comprises a charging receiving module 721, a charging executing module 722, a charging reporting module 723 and an event reporting module 724.

Please note that, there should be a plurality of SDN service devices 720, and each SDN service device 720 should comprise a charging receiving module 721, a charging executing module 722, a charging reporting module 723 and an event reporting module 724. Here, for brevity, FIG. 7 merely shows one SDN service device 720 which should not be considered as any interpretation or limitation of the present invention.

Preferably, the above charging determining module 711, charging configuration module 712 and charging updating module 713 can be integrated together as one function module to be equipped in the SDN control device 710, and such function module can be a charging control module, e.g., SCC. The above charging receiving module 721, charging executing module 722, charging reporting module 723 and event reporting module 724 can be integrated together as one function module to be equipped in the SDN service device 720, and such function module can be a charging module, e.g., SCF.

In conjunction with FIGS. 1 and 7, in step S301, the charging determining module 711 of the SDN control device 710 determines a charging plan and a corresponding routing path for a data flow of a user, wherein the charging plan is associated with a network condition-related rate of respective SDN service device in the corresponding routing path; then, the charging configuration module 712 of the SDN control device 710 configures, for the respective SDN service device 720, the charging plan and a network condition report associated with charging of the respective SDN service device 720; correspondingly, the charging receiving module 721 of the respective SDN service device 720 receives, from the SDN control device 710, the charging plan and the configuration of the SDN control device 710 for the network condition report associated with the charging of the SDN service device 720; then, the charging executing module 722 of the respective service device 720 charges the data flow based on its applicable network condition-related rate in the charging plan; the charging reporting module 723 of the respective SDN service device 720 aggregates the charging information generated by itself to provide it to the charging system. Afterwards, when change of the configured charging-associated network condition on at least one of the SDN service devices 720 occurs, the event reporting module(s) 724 of the SDN service device(s) 720 reports the corresponding charging-associated network condition to the SDN control device 710. When receiving the respective charging-associated network condition report of the SDN service device(s), the charging updating module 713 of the SDN control device 710 re-applies a new charging plan and a corresponding routing path for the data flow.

It should be noted that in the above preferred embodiment, the charging configuration module 712's configuration on the charging-associated network condition report for the respective SDN service device 720 is determined based on the charging plan determined by the charging determining module 711. Based on the charging plan, the charging configuration module 712 configures each SDN service device 720 as selected, and each SDN service device 720 should be report its charging-associated network condition change to the SDN control device 710, e.g., low balance of the flow path, causes increase of the rate or the increase above the threshold.

For example, the SDN service device 720₃ charges based on the criterion of network congestion level, while the SDN service device 720₄ charges based on the criterion of subscriber profile, then the charging configuration module 712 configures a corresponding network condition report for the SDN service device 3 or 4, respectively, such that when the rate of the SDN service device 720₃ or 720₄ changes, e.g., the SDN service device 720₃ changes from no congestion to congestion level 1, the corresponding rate will increase, and then the SDN service device 720₃ should send the network condition report to the SDN control device 710. Since the network condition report is associated with charging, it may be regarded as a charging event report. The charging event report may trigger the SDN control device to reselect an appropriate flow routing path based on the new network condition.

Preferably, the charging reporting module 723 and the event reporting module 724 can be integrated together. This is advantageous when the SDN service device 720 reports to the charging system via the SDN control device 710.

In conjunction with FIGS. 4 and 5, when the charging configuration module 712 further configures their respective charging-associated network condition reports for respective SDN service device 720, the smart charging plan should further include event report trigger in FIG. 5.

Moreover, the above operations performed by the event reporting module 724 and the charging updating module 714, i.e., charging event reporting and the application of the new charging plan and the corresponding routing path, do not have a strict sequential relationship with the operations performed by the charging determining module 711 and the charging configuration module 712 of the SDN control device 710 and the charging receiving module 721, charging executing module 722 and the charging reporting module 723 of the SDN service device 720. Here, for example, in a data flow transmission process, none of the rates of respective service devices 720 changes; then, the event reporting module 724 and the charging updating module 714 will not perform their corresponding operations. Each data flow is transmitted in a unit of package, and after one data package therein starts being transmitted, the network conditions of some SDN service devices 720 change; therefore, the event reporting module 724 and the charging updating module 714 work sequently, such that the routing path of the data flow is re-determined, and that the packages after the package adopt the re-determined routing path.

Here, when receiving the charging-associated network condition report from the SDN service device 720, the charging updating module 714 of the SDN control device 710 re-applies a new charging plan and its corresponding routing path for the data flow.

Here, the new charging plan may be determined together with the previous charging plan. In other words, when the charging determining module 711 determines a charging plan for the data flow, it may determine two charging plans, wherein one charging plan is adopted immediately, and the other charging plan may act as a candidate charging plan to be activated by the charging updating module 714.

Alternatively, the new charging plan may also be re-determined by the charging determining module 711 in real-time for the data flow, which is triggered when the charging updating module 714 receives the charging event report from the SDN service device 720. Herein, the manners in which the charging determining module 711 re-determines the new charging plan at least include: 1) re-performs step S301 to determine a new charging plan and a corresponding routing path; 2) based on the network function performed by the SDN service device 720 sending the charging event report, the charging determining module 711 re-selects an alternative SDN service device that can perform the same network function but has a lower rate so as to replace the reporting SDN service device in the current charging plan and routing path with a corresponding alternative SDN service device.

When the new charging plan and the corresponding routing path are determined, the respective module of the SDN control device still needs to continue performing its operation to control the configuration and execution of the new charging plan and routing path, and monitor the corresponding charging event report through cooperation with the respective SDN service device 720, so as to update the charging plan and the routing path at any time, thereby providing a smart charging plan and a routing path controlled thereby for the user.

In addition, the present invention also provides a solution of routing path selection based on routing rates in the SDN network. For example, referring to the above Table 1 and 2, SDN service devices 1 and 2 can provide the same network function, but they have different rates for data flow 1. Since data flow 1 requires a lower expense routing and the SDN service device 1 can currently provide a lowest rate (i.e. $0.50/Gb), SCC on the SDN control device select the SDN service device 1 for the data flow 1. And, in order to guarantee the data flow 1 can always get a lower expense data service, the SCC configures a charging event report of "Charging Rate Increased" for the SDN service device 1, such that SCF on the SDN service device 1 will send a corresponding report to the SDN control device if the rate for the data flow 1 increases. Then, data/service delivery starts, and the SCF on the SDN service device 1 calculates the real rates based on the smart tariff plan, i.e., Criterion of Network Condition is No Congestion, and aggregates charging information to send to the charging system. Congestion happens on the SDN service device 1, i.e., Criterion of Network Condition is Congestion Level 1, a new rate $1.50/Gb starts applying based on the smart tariff plan. The SCF on the SDN service device 1 reports the event to the SDN control device based on the configuration of charging event report. The SCC on the SDN control device re-select the SDN service device 2 to route the data flow 1, due to a currently lower rate $1.25/Gb on it.

It should be noted that the present invention may be implemented in software or a combination of software and hardware; for example, it may be implemented by an ASIC (Application Specific Integrated Circuit), a general-purpose computer, or any other similar hardware devices.

The software program of the present invention may be executed by a processor to implement the above steps or functions. Likewise, the software program of the present invention (including relevant data structure) may be stored in a computer readable recording medium, for example, a RAM memory, a magnetic or optical driver, or a floppy disk, and other similar devices. Besides, some steps or functions of the present invention may be implemented by hardware, for example, a circuit cooperating with a processor to execute various functions or steps.

Additionally, a portion of the present invention may be applied as a computer program product, for example, a computer program instruction, which, may invoke or provide a method and/or technical solution according to the present invention through operations of the computer when executed by the computer. Further, the program instruction invoking the method of the present invention may be stored in a fixed or mobile recording medium, and/or transmitted through broadcast or data flow in other signal bearer media, and/or stored in a working memory of a computer device which operates based on the program instruction. Here, one embodiment according to the present invention comprises an apparatus comprising a memory for storing a computer program instruction and a processor for executing the program instruction, wherein when the computer program instruction is executed by the processor, the apparatus is triggered to run the methods and/or technical solutions according to a plurality of embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims instead of the above description, and all variations intended to fall into the meaning and scope of equivalent elements of the claims should be covered within the present invention. No reference signs in the claims should be regarded as limiting of the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

Aspects of various embodiments are specified in the claims. Those and other aspects of various embodiments are specified in the following numbered clauses:

1. A method of performing charging control for a data flow at a SDN control device, the method comprising:
    a. determining a charging plan and a corresponding routing path for a data flow of a user, wherein the charging plan is associated with a network condition-related rate of respective SDN service device in the routing path;
    b. configuring the charging plan for the respective SDN service device, such that the respective SDN service device charges the data flow.

2. The method according to clause 1, wherein the step b further comprises:
    configuring, for the respective SDN service device, its charging-associated network condition report;
    wherein the method further comprises:
    i when a charging-associated network condition report of at least one of the SDN service devices is received, re-apply a new charging plan and its corresponding routing path for the data flow.

3. The method according to clause 2, wherein the step i further comprises:
    when a charging-associated network condition report of at least one of the SDN service devices is received, jumping to the step a, to re-determine a new charging plan and its corresponding routing path for the data flow.

4. A method for charging a data flow at a SDN service device, the method comprising:
    receiving a charging plan determined by a SDN control device for a data flow of a user;
    charging the data flow based on a network condition-related rate applicable to the SDN service device in the charging plan;
    aggregating generated charging information to provide it to a charging system.

5. The method according to clause 4, wherein the method further comprises:
    when receiving the charging plan, further receiving a configuration, by the SDN control device, of a charging-associated network condition report for the SDN service device; wherein the method further comprises:
    when change of the configured charging-associated network condition occurs, performing corresponding charging-associated network condition report to the SDN control device.

6. A method for charging a data flow in a SDN network, the method comprising:
    a SDN control device determines a charging plan and a corresponding routing path for a data flow of a user, wherein the charging plan is associated with a network condition-related rate of respective SDN service device in the routing path;
    the SDN control device configures the charging plan for the respective SDN service device;
    each of the SDN service device charges the data flow based on a network condition-related rate applicable to the SDN service device in the charging plan;
    the each of the SDN service device aggregates generated charging information to provide it to a charging system.

7. The method according to clause 6, wherein the method further comprises:
    when configuring the charging plan, the SDN control device further configures, for the respective SDN service device, its charging-associated network condition report;
    wherein the method further comprises:
    when change of its configured charging-associated network condition occurs on at least one of the SDN service devices, the at least one of the SDN service devices performs corresponding charging-associated network condition report to the SDN control device;
    the SDN control device re-applies a new charging plan and its corresponding routing path for the data flow.

8. An apparatus of performing charging control for a data flow at a SDN control device, the apparatus comprising:
    a charging determining module configured to determine a charging plan and a corresponding routing path for a data flow of a user, wherein the charging plan is associated with a network condition-related rate of respective SDN service device in the routing path;
    a charging configuration module configured to configure the charging plan for the respective SDN service device, such that the respective SDN service device charges the data flow.

9. The apparatus according to clause 8, wherein the charging configuration module is further configured to:
    configure, for the respective SDN service device, its charging-associated network condition report;
    wherein the apparatus further comprises:
    a charging updating module configured to re-apply a new charging plan and its corresponding routing path for the data flow, when a charging-associated network condition report of at least one of the SDN service devices is received.

10. The apparatus according to clause 9, wherein the charging updating module is further configured to:
  when a charging-associated network condition report of at least one of the SDN service devices is received, delivers a triggering signal to the charging determining module, so as to trigger the charging determining module to re-determine a new charging plan and its corresponding routing path for the data flow.

11. An apparatus for charging a data flow at a SDN service device, the apparatus comprising:
  a charging receiving module configured to receive a charging plan determined by a SDN control device for a data flow of a user;
  a charging executing module configured to charge the data flow based on a network condition-related rate applicable to the SDN service device in the charging plan;
  a charging reporting module configured to aggregating generated charging information to provide it to a charging system.

12. The apparatus according to clause 11, wherein the charging receiving module is further configured to:
  when receiving the charging plan, further receive a configuration, by the SDN control device, of a charging-associated network condition report for the SDN service device;
  wherein the apparatus further comprises:
    an event reporting module configured to, when change of the configured charging-associated network condition occurs, perform corresponding charging-associated network condition report to the SDN control device.

13. A system for charging a data flow in a SDN network, the system comprising a SDN control device and a plurality of SDN service devices, wherein the SDN control device comprises a charging control module, and the charging control module is configured to:
  determine a charging plan and a corresponding routing path for a data flow of a user, wherein the charging plan is associated with a network condition-related rate of respective SDN service device in the routing path;
  configure the charging plan for the respective SDN service device;
  wherein each of the SDN service device comprises a charging module, and the charging module is configured to:
    charge the data flow based on a network condition-related rate applicable to the SDN service device in the charging plan;
    integrate charging information generated by the SDN service device on which the charging module is equipped, to provide it to a charging system.

14. The system according to clause 13, wherein the charging control module is further configured to:
  when configuring the charging plan, further configures, for the respective SDN service device, its charging-associated network condition report;
  when a charging-associated network condition report of at least one of the SDN service devices is received, re-apply a new charging plan and its corresponding routing path for the data flow
  wherein the charging module is further configured to:
    when change of the configured charging-associated network condition occurs on the SDN service device where the charging module is equipped, perform corresponding charging-associated network condition report to the SDN control device.

What is claimed is:

1. A method of performing charging control for a data flow at a software defined network (SDN) control device, the method comprising:
  a. determining, by at least one processor of the SDN control device, a monetary charging plan for a user and a corresponding routing path for a data flow for the user, wherein the monetary charging plan is associated with a network condition-related rate of a respective SDN service device, of a plurality of SDN service devices, in the corresponding routing path, the network condition-related rate being a dynamically variable monetary rate tariff depending on a criterion of a network condition including subscriber profile information and an applicable network related state, the determining including selecting the respective SDN service device associated with a lowest-cost tariff for the user; and
  b. selecting, by the at least one processor, the monetary charging plan for the respective SDN service device, such that the respective SDN service device charges the data flow, the selecting including sending the monetary charging plan to the respective SDN service device and configuring the respective SDN service device so that the respective SDN service device implements the corresponding routing path.

2. The method according to claim 1, wherein the step b further comprises:
  configuring, for the respective SDN service device, its charging-associated network condition report;
  wherein the method further comprises:
  i. when a charging-associated network condition report of at least one of the SDN service devices is received, re-apply a new monetary charging plan and its corresponding routing path for the data flow.

3. The method according to claim 2, wherein the step i further comprises:
  when a charging-associated network condition report of at least one of the SDN service devices is received, jumping to the step a, to re-determine a new monetary charging plan and its corresponding routing path for the data flow.

4. A method for charging a data flow at a first software defined network (SDN) service device, the method comprising:
  receiving, by at least one processor of the first SDN device, a monetary charging plan for a user and a configuration of a charging-associated network condition report with a corresponding routing path for a data flow for the user that is determined by a SDN control device, the configuration charging-associated network condition report identifying the first SDN service device as a lowest-cost tariff for the user among a plurality of SDN devices;
  charging, by the at least one processor, the data flow based on a network condition-related rate applicable to the SDN service device in the monetary charging plan to generate charging information, the network condition-related rate being a dynamically variable monetary rate tariff depending on a criterion of a network condition including subscriber profile information and an applicable network related state; and
  aggregating, by the at least one processor, the generated charging information to provide it to a charging system.

5. The method according to claim 4, wherein the method further comprises:

when change of the configured charging-associated network condition occurs, performing corresponding charging-associated network condition report to the SDN control device.

6. A method for charging a data flow in a software defined network (SDN) network, the method comprising:

a SDN control device determines a monetary charging plan and a corresponding routing path for a data flow of a user, wherein the monetary charging plan is associated with a network condition-related rate of a respective SDN service device, of a plurality of SDN service devices, in the corresponding routing path, the network condition-related rate being a dynamically variable monetary rate tariff depending on a criterion of a network condition including subscriber profile information and an applicable network related state, the determining including selecting the respective SDN service device associated with a lowest-cost tariff for the user;

the SDN control device selecting the monetary charging plan for the respective SDN service device, the selecting including sending the monetary charging plan to the respective SDN service device and configuring the respective SDN service device so that the respective SDN service device implements the corresponding routing path;

each of the SDN service device charges the data flow based on a network condition-related rate applicable to the SDN service device in the monetary charging plan to generate charging information;

the each of the SDN service device aggregates the generated charging information to provide it to a charging system.

7. The method according to claim 6, wherein the method further comprises:

when configuring the monetary charging plan, the SDN control device further configures, for the respective SDN service device, its charging-associated network condition report;

wherein the method further comprises:

when change of its configured charging-associated network condition occurs on at least one of the SDN service devices, the at least one of the SDN service devices performs corresponding charging-associated network condition report to the SDN control device;

the SDN control device re-applies a new monetary charging plan and its corresponding routing path for the data flow.

8. A software defined network (SDN) control device, comprising:

a memory storing computer-readable instructions; and
at least one processor configured to execute the computer-readable instructions in order to, determine a monetary charging plan and a corresponding routing path for a data flow of a user, wherein the monetary charging plan is associated with a network condition-related rate of a respective SDN service device, of a plurality of SDN service devices, in the routing path, the network condition-related rate being a dynamically variable monetary rate tariff depending on a criterion of a network condition including subscriber profile information and an applicable network related state, the determining including selecting the respective SDN service device associated with a lowest-cost tariff for the user, and select the monetary charging plan for the respective SDN service device, such that the respective SDN service device charges the data flow, the selecting including sending the monetary charging plan to the respective SDN service device and configuring the respective SDN service device so that the respective SDN service device implements the corresponding routing path.

9. The SDN control device according to claim 8, wherein the at least one processor is further configured to:

configure, for the respective SDN service device, its charging-associated network condition report, and
re-apply a new monetary charging plan and its corresponding routing path for the data flow, when a charging-associated network condition report of at least one of the SDN service devices is received.

10. The SDN control device according to claim 9, wherein the at least one processor is further configured to:

when a charging-associated network condition report of at least one of the SDN service devices is received, re-determine a new monetary charging plan and its corresponding routing path for the data flow.

11. A first software defined network (SDN) service device, comprising:

a memory storing computer-readable instructions; and
at least one processor configured to execute the computer-readable instructions in order to, receive a monetary charging plan and a configuration of a charging-associated network condition report with a corresponding routing path for a data flow for a user that is determined by a SDN control device, the configuration charging-associated network condition report identifying the first SDN service device as a lowest-cost tariff for the user among a plurality of SDN devices, charge the data flow based on a network condition-related rate applicable to the SDN service device in the monetary charging plan to generate charging information, the network condition-related rate being a dynamically variable monetary rate tariff depending on a criterion of a network condition including subscriber profile information and an applicable network related state, and aggregate generated charging information to provide it to a charging system.

12. The first SDN service device according to claim 11, wherein the at least one processor is further configured to:

when change of the configured charging-associated network condition occurs, perform corresponding charging-associated network condition report to the SDN control device.

13. A system for charging a data flow in a software defined network (SDN) network, the system comprising a SDN control device and a plurality of SDN service devices, wherein the SDN control device includes a first memory storing first computer-readable instructions and at least one first processor configured to execute the first computer-readable instructions in order to:

determine a monetary charging plan and a corresponding routing path for a data flow of a user, wherein the monetary charging plan is associated with a network condition-related rate of a respective SDN service device, of the plurality of SDN service devices, in the routing path, the network condition-related rate being a dynamically variable monetary rate tariff depending on a criterion of a network condition including subscriber profile information and an applicable network related state, the determining including selecting the respective SDN service device associated with a lowest-cost tariff for the user;

select the monetary charging plan for the respective SDN service device, the selecting including sending the monetary charging plan to the respective SDN service device and configuring the respective SDN service device so that the respective SDN service device implements the corresponding routing path;

wherein each of the SDN service device includes at least one second memory storing second computer-readable instructions and at least one second processor configured to execute the second computer-readable instructions in order to:

charge the data flow based on a network condition-related rate applicable to the SDN service device in the monetary charging plan to generate charging information;

integrate the charging information to provide it to a charging system.

14. The system according to claim 13, wherein the at least one first processor is further configured to:

when configuring the monetary charging plan, further configures, for the respective SDN service device, its charging-associated network condition report, when a charging-associated network condition report of at least one of the SDN service devices is received, re-apply a new monetary charging plan and its corresponding routing path for the data flow, wherein the at least one second processor is further configured to:

when change of the configured charging-associated network condition occurs on the SDN service device where the at least one second processor is equipped, perform corresponding charging-associated network condition report to the SDN control device.

* * * * *